W. KOHL.
ICE BOX DRIPPING PAN SIGNAL.
APPLICATION FILED SEPT. 23, 1920.

1,370,124.

Patented Mar. 1, 1921.

INVENTOR:
William Kohl.
By A. M. Carlsen, Attorney.

UNITED STATES PATENT OFFICE.

WILLIAM KOHL, OF WAUSAU, WISCONSIN.

ICE-BOX DRIPPING-PAN SIGNAL.

1,370,124.  Specification of Letters Patent.  Patented Mar. 1, 1921.

Application filed September 23, 1920. Serial No. 412,216.

*To all whom it may concern:*

Be it known that I, WILLIAM KOHL, a citizen of the United States, residing at Wausau, in the county of Marathon and State of Wisconsin, have invented a new and useful Ice-Box Dripping-Pan Signal, of which the following is a specification.

My invention relates to signal devices; and the object is to provide the dripping pan under an ice box or refrigerator with a device which will automatically ring a bell and thus signal an alarm to empty the pan before it gets so full that the water runs over onto the floor and does damage.

Figure 1:
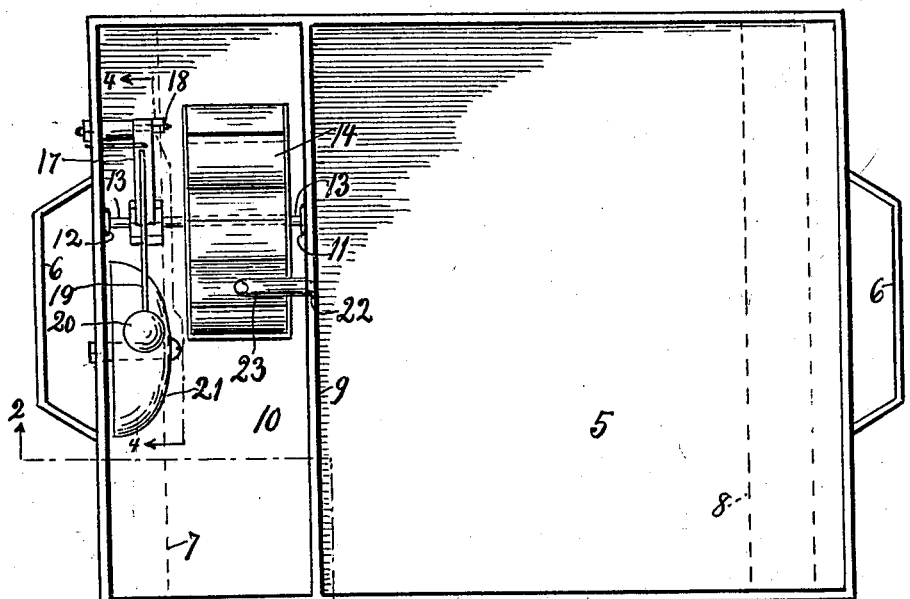
Figure 2:
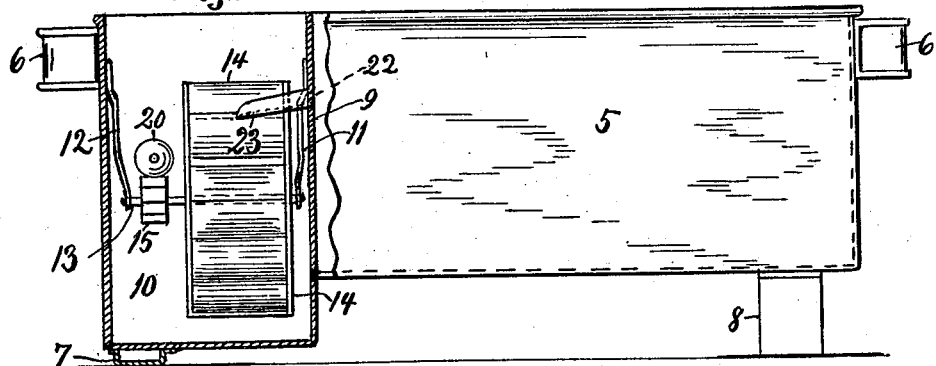
Figure 3:
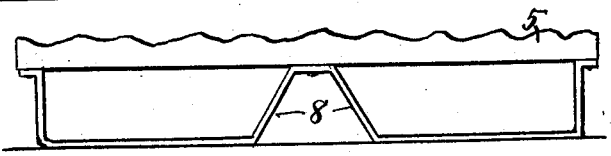
Figure 4:
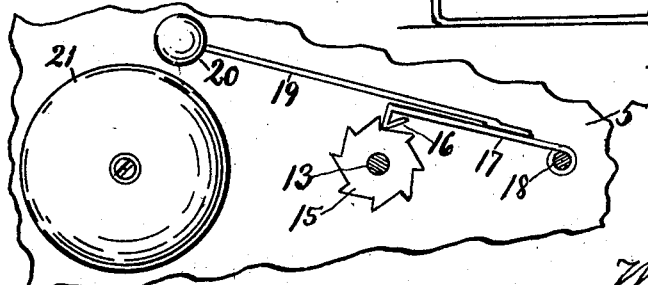

In the accompanying drawing:

Figure 1 is a top or plan view of a dripping pan equipped with my signal device. Fig. 2 is a section on the line 2—2 in Fig. 1, with the signal bell omitted. Fig. 3 is an elevation of the lower portion of the right hand end of Fig. 2. Fig. 4 is a section on the line 4—4 in Fig. 1.

Referring to the drawing by reference numerals, 5 designates the dripping pan usually put under an ice box to receive the water dripped from the melting ice. It is provided with handles 6 and legs 7 and 8 to support it sufficiently from the floor to prevent the latter from getting damp from the pan.

In the present case the pan has a partition 9 by which in one end of the pan a chamber 10 is created. Said chamber is somewhat deeper than the pan proper, and in it is journaled in two resilient hangers 11 and 12, the shaft 13 of a water wheel 14, which is preferably of the bucket wheel type. On said shaft 13 is also secured a ratchet wheel 15, upon whose teeth rests a tappet 16 of an arm 17, which is pivoted at 18 and carries a wire arm 19 with a metal ball 20 fixed on it, said elements 19, 20 constituting a hammer arranged to strike on a bell 21 when the ratchet wheel is rotated by the water wheel.

At a suitable distance from the top edge of the pan the partition 9 has an aperture 22 provided with a spout 23, which is arranged to lead the water into the buckets of the wheel 14 whenever the water in the pan is high enough to reach the aperture.

In the operation of the device, whenever the pan is full enough to cause water to run out through the spout 23 the bell will be rung and someone hearing the ringing will remove the pan, empty it and replace it under the ice box. Should the water wheel need cleaning or repair it may be easily removed from the hangers 11, 12, either one of which may be sprung beyond the end of the shaft 13 while the latter is being removed or replaced.

What I claim is:

1. A dripping pan for ice boxes and refrigerators, the same having a main compartment for the dripped water and a smaller compartment with a water wheel mounted therein, a spout leading from the upper part of the main compartment to the water wheel, a bell mounted in the small compartment, a hammer arranged to strike on the bell to ring it, and operative connection between the water wheel and the hammer, said smaller compartment being deeper than the main compartment so as to hold a sufficient quantity of water below the water wheel and received from the latter.

2. The structure specified in claim 1, said water wheel having the ends of its shaft journaled in resilient hangers, which permits the shaft to be easily removed and replaced and also avoids the use of bearings which might cause leakage in the walls holding them.

In testimony whereof I affix my signature.

WILLIAM KOHL.